United States Patent Office 3,009,949
Patented Nov. 21, 1961

3,009,949
PRODUCTION OF GUANIDINE SALTS
Louis E. Craig and John T. Minor, Pryor, Okla., assignors, by mesne assignments, to Deere & Company, a corporation of Delaware
No Drawing. Filed Apr. 9, 1958, Ser. No. 727,239
8 Claims. (Cl. 260—501)

This invention relates to an improved process for the production of guanidine salts.

Guanidine is an industrially important chemical which finds extensive use in the production of nitroguanidine used as a flashless explosive. Guanidine salts are used as intermediates in the production of sulfa drugs, dyes and resinous compositions of one kind and another, and guanidine carbonate has been suggested as an additive to surface active agents used in wool scouring. Guanidine phosphate is used as a flame-proofing agent for textiles, guanidine stearate as a soap filler, and aryl derivatives such as symmetrical-diphneylguanidine and symmetrical-di-o-tolylguanidine as accelerators in the vulcanization of rubber.

Guanidine is available commercially in the form of the nitrate, hydrochloride, or carbonate salts, and is prepared industrially by processes based on the reaction of calcium cyanamide or calcium dicyandiamide with ammonium salts.

A number of techniques for the preparation of guanidine salts such as the phosphates are known. For example, the preparation of guanidine phosphate has been suggested by reacting urea, ammonia and phosphorus pentoxide, including carrying out of the reaction in non-aqueous solvents and in the presence of accelerators such as finely divided nickel aluminum, aluminum chloride or manganese dioxide. Diguanidine phosphate has been reportedly produced by fusing urea and phosphorus pentoxide. The production of guanidine phosphate has also been reportedly obtained by a technique involving forcing dicyandiamide and ammonium phosphate through an autoclave at elevated temperatures and pressures. Another suggested technique for guanidine phosphate production involves heating hydrogen cyanide, ammonia and phosphoric acid with catalysts at elevated temperatures and pressures. Furthermore, the preparation of guanidine salts other than the phosphate has been proposed by using as reactants urea and ammonium nitrate, sulphur dioxide, ammonium sulfamate, ammonium chloride, and aluminum sulphate.

None of the foregoing processes are completely satisfactory for commercial use either because of extensive equipment requirements, low yields, impurity of resulting product or high cost of reactants.

It has more recently been proposed that urea, certain ammonium salts and a carrier such as silica gel be heated to produce guanidine salts on the adsorbent. Using that process, however, results in the formation of not only the guanidine salts, but ammonia and carbon dioxide as well; that process is wasteful, involves a different reaction mechanism, and results in low yields, of the order of 20% or 30%.

We have now found that guanidine salts can be obtained simply and economically, and in unexpectedly good yield by reacting urea with ammonium metaphosphate, at a temperature of about 200° to 300° C.; the desired guanidine salt is obtained by adding the appropriate acid to the resulting reaction mixture, preferably after the latter has been cooled and dissolved in water. The solution is evaporated and then chilled to precipitate the salt. Desirably, the molar raito of ammonium metaphosphate to urea is about 1 to 1.5, although a satisfactory range is from about 1:1 to 1:2. The optimum reaction temperature is of the order of about 250° C., and the reaction is completed in ½ to 1 hour when temperatures of 200° to 300° C. are used. Carrying out the reaction in a closed system is advantageous insofar as yield is concerned, although the process can also be carried out at atmospheric pressure. Autogeneous pressures not in excess of about 50 p.s.i.g. are preferred. Our process has, as one unique characteristic, the fact that the ammonium metaphosphate serves both as a source of ammonia and as a dehydrating agent, when it is reacted with urea, as exemplified by the following illustrative equation:

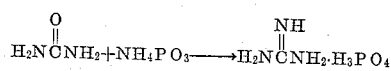

While the precise reaction mechanisms which are involved in our process are not very well established or even completely understood, it appears as though the foregoing simplified reaction can be considered taking place in two steps wherein the first step (1) involves an equilibrium reaction with urea, ammonium and water the equilibrium being essentially in the direction of urea and ammonia, and being forced to the right as water is removed by an irreversible reaction, which may be represented by reaction (2).

(1) 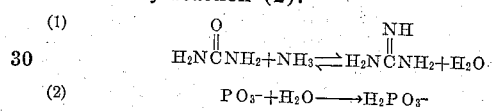

(2) $PO_3^- + H_2O \longrightarrow H_2PO_3^-$

In our process the guanidine forms, with the phosphate moiety of the ammonium metaphosphate, some kind of a guanidine-phosphate reaction product; however, whether the product formed is guanidine orthophosphate, guanidine pyrophosphate, guanidine polyphosphate, diguanidine orthophosphate, or some other phosphate, is not definitely known.

A unique feature of our process is that ammonia and carbon dioxide are not formed, it being, of course, undesirable to "use up" urea in the formation of ammonia and carbon dioxide, as is characteristic of some other processes. The present invention is based upon the quite unexpectedly good yields of guanidine obtained when ammonium metaphosphate is reacted with urea; nothing in the prior art would indicate that either such high yields could be obtained or that the reaction would even occur to any appreciable extent, without the use of an adsorbent of some kind. Our invention will be further detailed in the following examples, it being understood that these are set forth for illustrative purposes only and not by way of limitation.

EXAMPLE I

A finely ground mixture of 26 parts of ammonium metaphosphate and 22 parts of urea was heated in a closed vessel without agitation at 250° C. for one hour. The reaction mixture was then cooled, removed from the reactor and the guanidine content determined by the method of Fainer and Myers, Anal. Chem., 24, 515 (1952). The analysis indicated a production of 76% guanidine based on the ammonium metaphosphate.

EXAMPLE II

The same general procedure as set forth in Example I was followed in making a number of runs in order to determine the effects of temperature, time, molar ratio of reactants, and pressure, on the reaction. In some cases ammonia was added to give varying ammonia pressures. The results obtained are set forth in Table I below:

Table I

| Run No. | Mole Ratio, $NH_4PO_3$/Urea | Temp., °C. | Time, Hrs. | Pressure [1] | Yield of Guanidine, Percent |
|---|---|---|---|---|---|
| 1 | 1.4/1 | 300 | 1 | Atm | 23.0 |
| 2 | 1.1/1 | 200 | 1 | Atm | 18.0 |
| 3 | 1/1 | 200–250 | 1 | Auto | 43.0 |
| 4 | 1/1 | 250 | 2 | Auto | 42.8 |
| 5 | 1/1.5 | 250 | 1 | Auto | 76.1 |
| 6 | 1/2 | 250 | 1 | Auto | 71.1 |
| 7 | 1/1.8 | 250 | 0.5 | Auto | 74.7 |
| 8 | 1/1.8 | 200 | 0.5 | Auto | 19.6 |
| 9 | 1.5/1 | 250 | 0.5 | Auto | 45.4 |
| 10 | 1/1.5 | 275 | 0.5 | Auto | 65.5 |
| 11 | 1/1.5 | 250 | 0.5 | 150 | 75.8 |
| 12 | 1/1 | 250 | 0.5 | 200 | 31.9 |
| 13 | 1/1.5 | 250 | 0.5 | 1,500 | 40.2 |

[1] Atm.=atmospheric pressure; Auto.=autogenous pressure (below 50 p.s.i.g.); figures represent pressures (p.s.i.g.) of ammonia.

EXAMPLE III

A mixture of 195 parts of ammonium metaphosphate and 165 parts of urea was placed in a reaction vessel (closed) and the reaction carried out at 260° C. for 40 minutes, according to the procedures described in Example I above. The reaction mixture was then cooled, removed from the vessel and dissolved in 2000 parts of water. After filtration of the water solution to remove a small amount of insolubles, 17 parts of 71% nitric acid were added. The solution was then evaporated by heating to one-fourth of the original volume, chilled, and the crystalline product collected by filtration. The mother liquor was evaporated further to yield a second crop of product. The combined yield was 178 parts (67.5% yield based on ammonium metaphosphate) of guanidine nitrate which melted at 203–206° C. One recrystallization from water gave a product which melted at 210–212° C.

EXAMPLE IV

Example III was repeated up to and including filtration of the water solution of the cooled reaction mixture; to that filtered reaction solution, which contained 90 parts (76% theory) of guanidine by analysis, there was added sufficient 95% orthophosphoric acid (instead of nitric acid) to bring the pH of the solution to about 4.0. The solution was then evaporated by heating, chilled, and a crystalline product collected by filtration in good yield. One recrystallization from water gave a compound melting at 127.5–129° C. Analysis showed that the compound was

EXAMPLE V

Example III was repeated through the step of filtration of the water solution of the cooled reaction mixture; instead of nitric acid, an equivalent of salicylic acid dissolved in aqueous ammonia was added, and after concentration a crystalline material was obtained in good yield. The decomposition point of the material after two recrystallizations from water was 174–176° C. Guanidine analysis showed that the material was guanidine salicylate.

EXAMPLE VI

The procedure of Example III was followed up to the point of nitric acid addition; instead of nitric acid, an excess of 30% calcium picrate solution was added to the filtered solution resulting from the reaction. Sufficient disodium ethylenediaminetetra-acetate solution (Versene) was also added in order to prevent precipitation of calcium phosphate. 308 parts of guanidine picrate (76% of theory) precipitated. The melting point of the product was 322–333° C.

EXAMPLE VII

The procedure of Example III was followed up to the point of nitric acid addition; then, instead of nitric acid, fumaric acid was dissolved in aqueous ammonia and added to the filtered reaction solution. After evaporation and chilling of the concentrated solution, a solid material in good yield was obtained. Following one recrystallization from water the decomposition point of the product was 179–182° C., and consisted of guanidine fumarate, which, based on saponification number, had about one molecule of guanidine to one molecule of fumaric acid.

It will be obvious that other guanidine salts can be prepared in accordance with our process, as for example, guanidine sulphate, and the like, by following, for example, the procedure of Example III, but substituting a molar equivalent of sulfuric acid for the nitric acid of Example III to produce guanidine sulphate. Substitution of other acids, inorganic as well as organic, will result in the corresponding salts. And while a dry mixture of urea and ammonium metaphosphate is quite suitably used in carrying out our process, solvents such as glycols, alcohols, dioxane as well as high boiling liquids like hydrocarbons, diphenylethers and the like can be used to expedite introduction and removal of products from the reaction vessel, either as solutions or slurries.

Additionally, economy measures can be practiced with our invention by recovering, or using the phosphate solution as by neutralizing with ammonia to produce valuable fertilizer solutions or solids.

We claim:

1. A method of producing a guanidine salt which comprises heating together a mixture of ammonium metaphosphate and urea at a temperature of about 200° C. to 300° C. to form a guanidine-phosphate reaction product the molar ratio of said ammonium phosphate to said urea being in the range of from about 1:1 to 1:2.

2. A method of producing a guanidine salt which comprises heating a mixture containing essentially ammonium metaphosphate and urea, the molar ratio of ammonium metaphosphate to urea being from about 1:1 to 1:2 to a temperature of about 200° C. to 300° C., and maintaining the reaction mixture at this temperature for about one-half to one hour.

3. The method of claim 2 in which the mixture is heated in a closed system.

4. A method of producing a guanidine salt which comprises heating a reaction mixture containing one mole of ammonium metaphosphate for each 1 to 2 moles of urea to a temperature of about 200° C. to 300° C., maintaining the reaction mixture within this temperature range until the reaction is substantially completed, cooling the reaction mixture, admixing an acid and the said reaction mixture, and removing the resulting guanidine salt therefrom.

5. The method of claim 4 in which the said acid is orthophosphoric acid.

6. The method of claim 4 in which the said acid is salicyclic acid.

7. The method of claim 4 in which the said acid is fumaric acid.

8. The method of claim 4 in which the said acid is nitric acid.

References Cited in the file of this patent

UNITED STATES PATENTS

| 2,131,127 | Horst | Sept. 27, 1938 |
| 2,221,478 | Hill | Nov. 12, 1940 |
| 2,417,440 | Paden | Mar. 18, 1947 |

FOREIGN PATENTS

| 527,237 | Germany | June 23, 1931 |

OTHER REFERENCES

Kiehl et al.: J.A.C.S., volume 49, pages 131–2 (1927).
Mellor: Modern Inorganic Chemistry, p. 767 (1952).